(No Model.)

G. W. CARR.
GUIDE WHEEL FOR PLOWS.

No. 270,742. Patented Jan. 16, 1883.

WITNESSES:
Francis McArdle
C. Sedgwick

INVENTOR:
G. W. Carr
BY Munn & Co.
ATTORNEYS.

UNITED STATES PATENT OFFICE.

GEORGE W. CARR, OF NEW YORK, N. Y., ASSIGNOR TO CARR & HOBSON, (LIMITED,) OF SAME PLACE.

GUIDE-WHEEL FOR PLOWS.

SPECIFICATION forming part of Letters Patent No. 270,742, dated January 16, 1883.

Application filed September 7, 1882. (No model.)

*To all whom it may concern:*

Be it known that I, GEORGE W. CARR, of the city, county, and State of New York, have invented a new and useful Improvement in Guide-Wheels for Plows, of which the following is a full, clear, and exact description.

Heretofore it has been customary to make the metal front or guide wheel of a plow of open-work form, and with arms or spokes, which catch and gather weeds, grass, and other substances that greatly clog or impede the running of the wheel and working of the plow.

My invention consists in a metal guide-wheel for a plow, made in sections transversely of the axis of the wheel, and so that the wheel is of a close box form, and presents flush or plain surfaces on its sides, thereby preventing all possibility of becoming clogged or choked.

Reference is to be had to the accompanying drawings, forming part of this specification, in which similar letters of reference indicate corresponding parts in all the figures.

Figure 1:
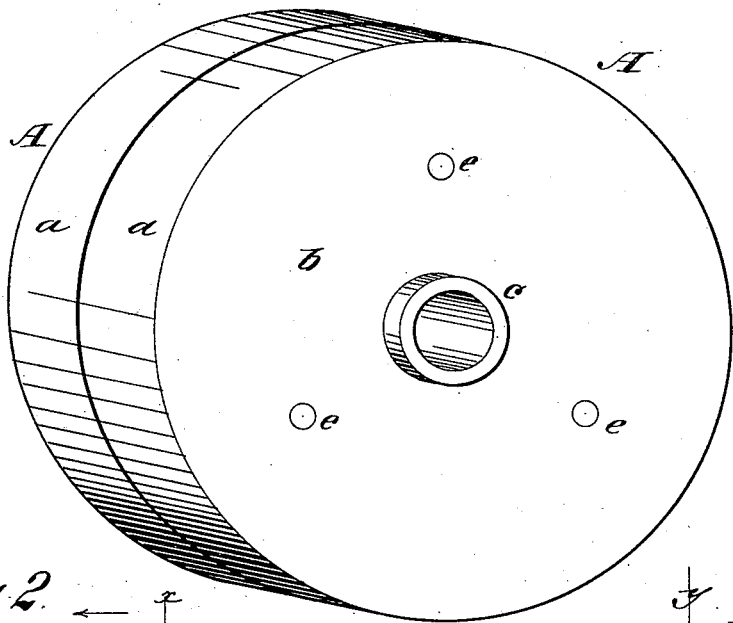
Figure 2:
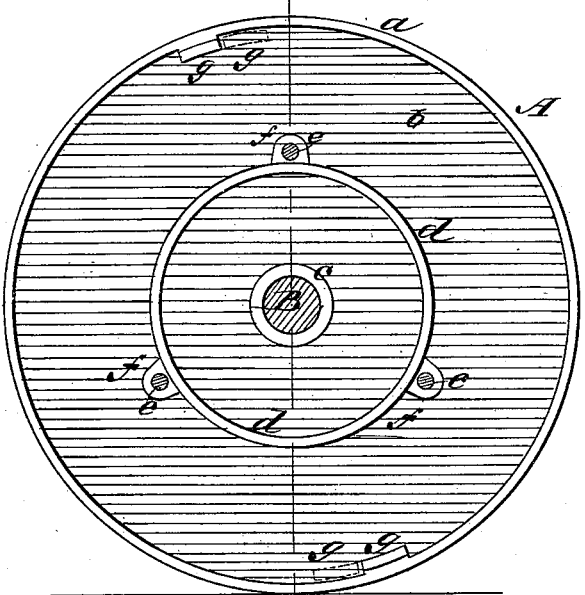
Figure 3:
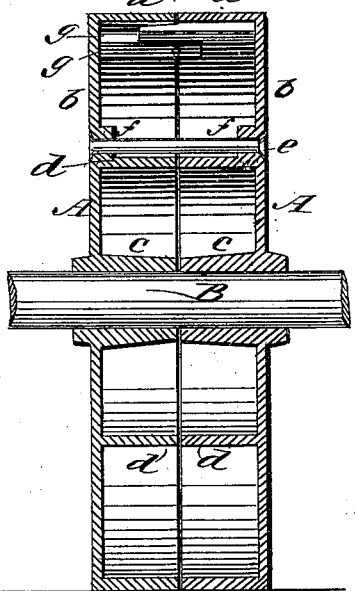

Figure 1 represents a view in perspective of the front guide-wheel of a plow constructed in accordance with my invention; and Figs. 2 and 3, vertical sections of the same in planes at right angles with each other on the lines $x$ $x$ and $y$ $y$, respectively.

The front or guide wheel of a plow represented in the drawings is a cast-metal one, of a close or box form of construction, and presents not only a smooth or plain periphery, $a$, but also plain or close sides $b$ $b$ on its exterior. This construction excludes all possibility of the wheel becoming choked or the plow impeded by the catching or gathering of weeds, grass, or other obstructions by the wheel as the plow is worked over the ground. To thus construct the wheel free from any salient exterior projections, it is cast in sections transversely of its axis. Thus it is shown made in two equal sections, A A, each with a transversely-divided hub, $c$ $c$, and similarly-divided interior annular brace, $d$ $d$, cast on it, and the two sections A A united by bolts $e$ $e$, passing through them from side to side of the wheel, and through bosses $f$ $f$ on the inside of said sections. These bolts are virtually elongated rivets, and made with countersunk heads, which enter countersinks in the sides of the wheel, to keep said sides flush or clear of any salient obstructions, for the purposes hereinbefore named.

To facilitate the putting together of the wheel on the spindle B, which carries it, the wheel-sections A A are cast with interior stops, $g$ $g$, which, by turning said sections on their spindle or shaft, serve, as they are brought one against the other, to bring the bolt-holes through the sections A A in line for the insertion of the bolts or rivets $e$ $e$. Instead, however, of constructing the wheel of two equal transverse sections, A A, as shown, it may be made in sections of unequal width on their periphery; or the one section may take in the entire periphery and one side of the wheel, and the opposite side be a mere close disk; or both sides may be close disks and the body of the wheel take in only the peripheral portion of it. In either case the wheel will be divided transversely of its axis and present a close and plain exterior surface on its sides.

I am aware that it is not broadly new to construct a wheel of two disks, in which the rim and hub are connected by spokes or metal concaved on the outside, or to form seed-dropping wheels, hollow on the inside to hold the seed; but my wheel is made hollow, so as to combine lightness and breadth of rim, and in two parts, so that it may be conveniently cast.

What I claim as new and of my invention is—

1. The hollow sections of a plow guide-wheel having the interior annular and opposite braces, $d$ $d$, arranged between the rim or periphery $a$ and the hub $c$, as shown and described.

2. In a metal guide-wheel for a plow, the combination of the two transverse sections A A, having plain and close sides $b$ $b$, attached hub-sections $c$ $c$, and stops $g$ $g$, with the bolts or rivets $e$ $e$, the heads of which are countersunk in the sides of the wheel, substantially as and for the purposes herein set forth.

3. The hollow sections of a two-part guide-wheel for plows, provided with the opposite bosses $f\ f$, in combination with bolts or rivets $e$, passing through said bosses and having their heads countersunk in the outside of and until flush with the outer faces of sides $d$, as shown and described.

GEO. W. CARR.

Witnesses:
 LEO ALEXANDER,
 E. C. CARR.